(12) United States Patent
Egger et al.

(10) Patent No.: US 8,165,428 B2
(45) Date of Patent: Apr. 24, 2012

(54) OPTICAL IMAGING BASED COMPUTER POINTING

(75) Inventors: Ron D Egger, Banks, OR (US);
Nicholas W Oakley, Portland, OR (US);
Wah Yiu Kwong, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1059 days.

(21) Appl. No.: 12/059,007

(22) Filed: Mar. 31, 2008

(65) Prior Publication Data
US 2009/0245569 A1   Oct. 1, 2009

(51) Int. Cl.
*G06K 9/00* (2006.01)
(52) U.S. Cl. .................. 382/312; 382/190; 382/307
(58) Field of Classification Search ............. 382/190, 382/312, 321
See application file for complete search history.

(56) References Cited

U.S. PATENT DOCUMENTS

| | | | | |
|---|---|---|---|---|
| 5,953,448 A * | 9/1999 | Liang | ............... | 382/154 |
| 6,167,295 A * | 12/2000 | Cosman | ............... | 600/426 |
| 6,195,445 B1 * | 2/2001 | Dubuisson-Jolly et al. | .. | 382/107 |
| 6,275,725 B1 * | 8/2001 | Cosman | ............... | 600/426 |
| 7,158,659 B2 * | 1/2007 | Baharav et al. | ............... | 382/124 |
| 7,242,805 B1 * | 7/2007 | Reihani | ............... | 382/198 |
| 7,274,808 B2 * | 9/2007 | Baharav et al. | ............... | 382/124 |
| 7,313,255 B2 * | 12/2007 | Machida et al. | ............... | 382/107 |
| 7,317,448 B1 * | 1/2008 | Sasselli et al. | ............... | 345/166 |

* cited by examiner

*Primary Examiner* — Yosef Kassa
(74) *Attorney, Agent, or Firm* — Garrett IP, LLC

(57) ABSTRACT

Methods and systems for optical imaging based computer pointing, including optical imaging based pointing motion and button functionality. Optical image motion information is translated to a computer pointing device data format, and one or more patterns, sequences, or combinations of optical image information are translated to one or more corresponding pointing device button select indications in the pointing device data format.

20 Claims, 4 Drawing Sheets

OPTICAL IMAGING BASED COMPUTER POINTING

BACKGROUND

1. Technical Field

Methods and systems disclosed herein are directed to optical imaging based computer pointing, including optical imaging based pointing motion and optical imaging based button functionality.

2. Background

Computer pointing devices (hereinafter, "pointing devices"), include a motion detector and one or more buttons. Some pointing devices further include a scroll wheel. Pointing devices include mice, touch pads, and joysticks. Pointing devices allow users to interface with a computer system through a graphical user interface (GUI) associated with an application program and/or an operating system executing on the computer system. Computer systems include pointing device driver software that enables the computer system to interface with a computer pointing device in a pointing device data format.

Drawbacks of conventional pointing devices include relatively large power requirements, relatively large area requirements, component costs, and the use of mechanical buttons, which require additional power, area, and cost, and are prone to mechanical failure.

Optical imaging systems generate image information corresponding to light reflected from an object proximate thereto. Optical imaging systems are available that require less power and area, and are less expensive than pointing devices.

BRIEF DESCRIPTION OF THE DRAWINGS/FIGURES

Figure 1:
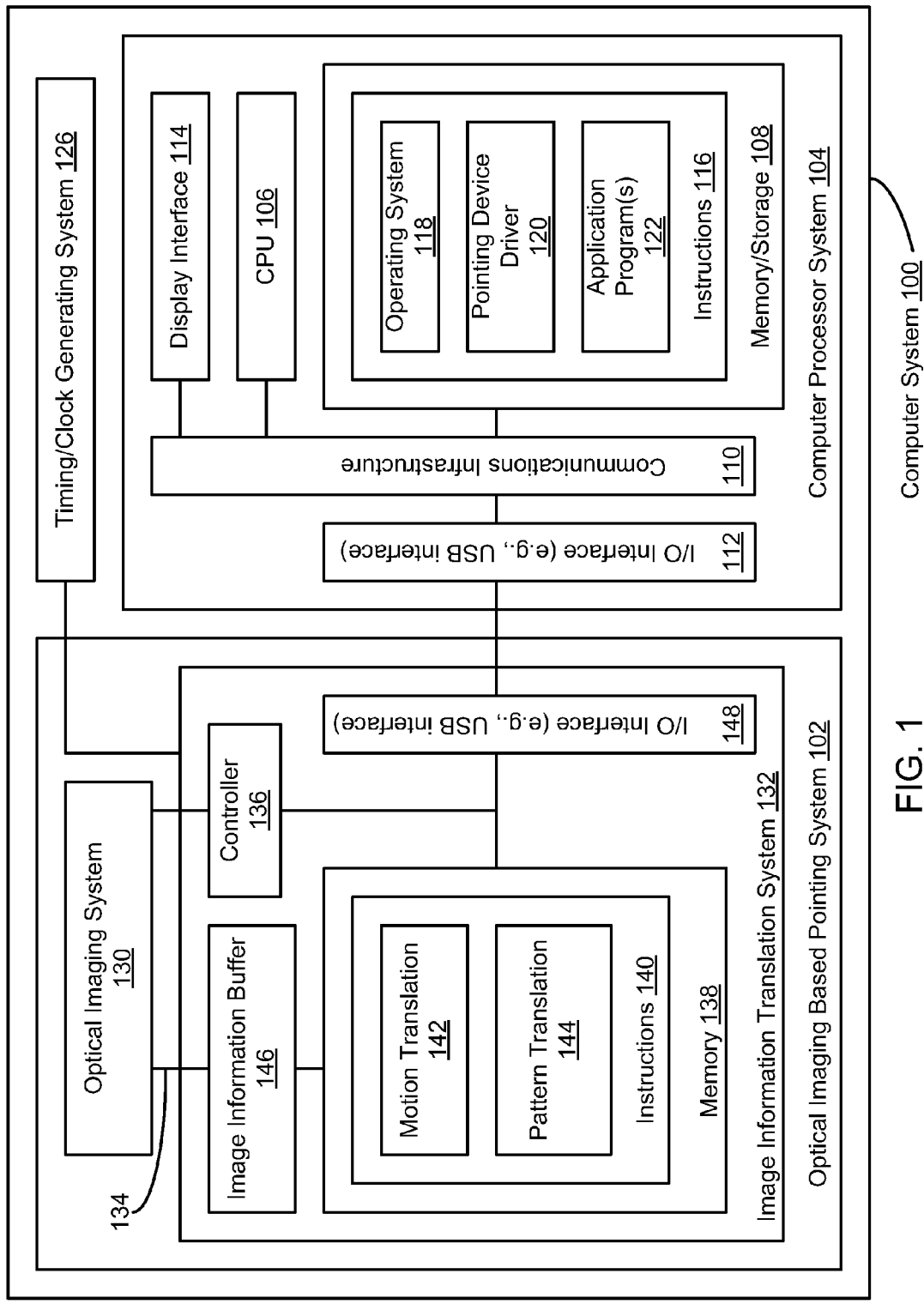
FIG. 1 is a block diagram of an exemplary computer system 100 including an optical imaging based pointing system 102.

In the drawings, the leftmost digit(s) of a reference number identifies the drawing in which the reference number first appears.

DETAILED DESCRIPTION

FIG. 1 is a block diagram of an exemplary computer system 100 including an optical imaging based pointing system 102 and a computer processor system 104.

Computer processor system 104 generally includes one or more central processing units (CPUs) 106, memory/storage 108, communications infrastructure 110 to provide communications amongst elements within computer processor system 104, input/output (I/O) interface 112 to communicate with elements external of computer processor system 104, and which may include a universal serial bus (USP) interface described below, and a display interface 114 to communicate with a display.

Memory/storage 108 may include, without limitation, random access memory, storage memory, such as a hard disk drive, and/or one or more removable memory units. Memory/storage 108 includes a computer readable medium having computer program logic, illustrated in FIG. 1 as instructions 116, and also known as computer code or software, stored therein and executable by CPU 106. Instructions 116 include an operating system 118, one or more device drivers, including a pointing device driver 120, and one or more application programs 122.

Pointing device driver 120 enables CPU 106 to interface with optical imaging based computer pointing system 102, through I/O interface 112, using a conventional pointing device data format, such as for example and without limitation, one or more pointing device data formats described below, and/or one or more future pointing device data formats.

Optical imaging based pointing system 102, and a timing/clock generating system 126, are described below.

Additional functions, features, implementation details, and operation of computer processor system 104, are well known to those skilled in the relevant art(s).

Pointing Devices, Drivers and Data Formats

Pointing devices allow users to interface with a computer system through a graphical user interface (GUI) associated with an application program and/or operating system executing on the computer system. Pointing device motion is typically used to control two-dimensional motion in a GUI. Button functionality is typically assigned by an application program associated with an active GUI, or by an operating system. Where a pointing device includes multiple buttons, a left button is typically used to select items or features corresponding to a cursor position within the GUI, or to select an area or set of features within the GUI for a subsequent operation. A right button is typically used to display a menu of available options. A middle button, scroll button, and/or scroll wheel may be included to scroll through the GUI.

In some application domains, such as computer gaming environments, pointing device motion may be translated into player movement in a GUI and/or to change a visual orientation of the GUI. For example, pointing device motion along the x-axis may translate to changes in horizontal orientation (e.g., looking left or right). Pointing device motion along the y-axis may translate to changes in vertical orientation (e.g., looking up or down). Multiple pointing devices may be employed to provide multiple motion functionality. One or more pointing device buttons may provide various functions as defined by a gaming application, such as body positioning (e.g., jumping, crouching, and climbing). In a first-person shooter genre of games, one button typically controls primary fire, while another button may control secondary fire from a selected weapon and/or options associated with a weapon. A scroll wheel can be used to change weapons, features associated with weapons, and/or visual orientation of the GUI.

Many computer pointing devices currently utilize a universal serial bus (USB) connector and a USB Human Interface Device (HID) data format. USB connector and data format standards are provided by the USB Implementers Forum, having an Internet Web Site at http://www.usb.org/home. USB HID data formats are defined in a number of documents provided by the Device Working Group of the USB Implementers Forum. One such document, titled, "Device Class Definition for Human Interface Devices (HID), Firmware Specification—Jun. 27, 2001, Version 1.11," available at http://www.usb.org/developers/devclass_docs/HID1_11.pdf, at page 70, Appendix E, provides a USB HID data format for computer mice in Table 1 below.

TABLE 1

| Byte | Bits | Description |
|------|------|-------------|
| 0 | 0 | Button 1 |
|   | 1 | Button 2 |
|   | 2 | Button 3 |
|   | 4-7 | Device-Specific |
| 1 | 0 to 7 | X Displacement |
| 2 | 0 to 7 | Y Displacement |
| 3 to n | 0 to 7 | Device Specific |

Other cabled pointing devices have been implemented with various interface connectors commonly known as RS-232C, PS/2, and Apple Desktop Bus (ADB), the latter two of which are described below. Cordless mice transmit data via infrared radiation or radio frequency transmission to a compatible receiver, which is connected to the computer system typically through a wired serial bus such as those listed above.

IBM Corporation developed the PS/2 interface connector having a round 6-pin connector and corresponding data format. In a default or stream mode, a PS/2 mouse communicates motion and the state of each button using 3-byte packets. For any motion, button press or button release event, a PS/2 mouse sends, over a bi-directional serial port, a sequence of three bytes, as illustrated in Table 2 below.

TABLE 2

|        | Bit 7 | Bit 6 | Bit 5 | Bit 4 | Bit 3 | Bit 2 | Bit 1 | Bit 0 |
|--------|-------|-------|-------|-------|-------|-------|-------|-------|
| Byte 1 | YV | XV | YS | XS | 1 | MB | RB | LB |
| Byte 2 |    |    |    | X motion |    |    |    |    |
| Byte 3 |    |    |    | Y motion |    |    |    |    |

In Table 2, XS and YS represent the sign bits of motion vectors, XV and YV indicate an overflow in the respective vector component, and LB, MB and RB indicate the status of the left, middle and right mouse buttons (1=pressed). PS/2 mice also understand several commands for reset and self-test, switching between different operating modes, and changing the resolution of the reported motion vectors.

A Microsoft IntelliMouse relies on an extension of the PS/2 protocol known as ImPS/2 or IMPS/2 protocol. The Intelli-Mouse initially operates in standard PS/2 format, for backwards compatibility. After a host computer system sends a special command sequence, the IntelliMouse switches to an extended format in which a fourth byte carries information about scroll wheel motion. A Microsoft IntelliMouse Explorer utilizes the 4-byte packets to allow for two additional buttons (for a total of five).

For a time, computers manufactured by Apple, Inc., used the Apple Desktop Bus (ADB), which permitted mice and other devices to connect via a single data pin that was polled for mouse communications.

A Typhoon mouse uses 6-byte packets, which can appear as a sequence of two standard 3-byte packets, such that ordinary PS/2 driver can handle them.

A Mouse Systems Corporation mouse uses a five-byte protocol that supports three buttons.

Optical Imaging Based Computer Pointing

Optical imaging based pointing system 102 includes an optical imaging system 130 and an image information translation system 132 coupled thereto.

Optical imaging system 130 is configured to generate image information 134 corresponding to objects near an optical window of optical imaging system 130. Image information 134 may include image presence information indicative of object presence, and image motion information indicative of object motion. Image motion information may include two-dimensional coordinate information, such as $\Delta X$ and $\Delta Y$ information. Image presence information may include an indication of a quality and/or strength of an object image.

Optical imaging system 130 includes a light source, which may be an infrared emitter or a light emitting diode, positioned to emit light outwardly from the optical window. Optical imaging system 130 further includes an array of corresponding light sensors, such as infrared or photo sensors, positioned to receive light emitted from the light source and reflected back towards the optical window by an object. Optical imaging system 130 may include a lens or lens system to direct the reflected light to the array of light sensors.

Optical imaging system 130 further includes an image processing system coupled to outputs of the array of light sensors, to generate image information 134 therefrom. Alternatively, the image processing system or portions thereof are implemented external of optical imaging system 130. The optical imaging system may include one or more registers to store image information indicative of motion, $\Delta Y$ motion information, $\Delta X$ motion information, and a measure of a number of visible object features. The registers may be read upon receipt of addressing and control information from a requester.

Optical imaging system 130 may be implemented with, for example and without limitation, an optical imaging system manufactured by Avago Technologies.

Image information translation system 132 is configured to translate image motion information within image information 134 to a pointing device data format that is compatible with pointing device driver 120.

Image information translation system 132 is further configured to translate one or more patterns, sequences, or combinations of image information, detected over a period of time, to one or more corresponding pointing device button select indications, in the pointing device data format. The one or more patterns may include image information associated with one or more instances of a user tapping on the optical window of optical imaging system 130.

Image information translation system 132 may be implemented in hardware, software, firmware, or combinations thereof, including an application specific integrated circuit and/or a micro-controller having computer program logic stored therein.

In the example of FIG. 1, image information translation system 132 is illustrated as a micro-controller, including a controller 136 having logic and arithmetic elements to execute computer program logic, illustrated in FIG. 1 as instructions 140, stored in a memory 138. Instructions 140 include motion translation instructions 142 and pattern translation instructions 144.

Motion translation instructions 142 cause controller 136 to translate image motion information within image information 134 to the computer pointing device data format, which may be two-dimensional motion information.

Pattern translation instructions 144 cause controller 136 to translate image information 134 to a computer pointing device button select indication, in the computer pointing device data format, when image information 134 matches a pattern of image information associated with the computer pointing device button.

Pattern translation instructions 144 may include touch detection logic or instructions that cause controller 136 to associate image information 134 with an object touch to the optical window when image information 134 includes an indication of object visibility and substantially no corresponding image motion, preceded and followed by indications of object non-visibility. The indication of object visibility and substantially no corresponding image motion is associated with a stationary object proximate to the optical window. The indications of object non-visibility, preceding and following a stationary object, help to insure that a stationary object corresponds to a tap, rather a temporary user pause following or preceding user motion across the optical window.

Memory 138 may also be used to store data and/or other instructions, permanently or temporarily, including input/output interface data and/or instructions. Memory 138 may include one or more of read-write memory, read-only memory, programmable read-only, erasable programmable read-only memory, and/or other types of memory.

Image information translation system 132 further includes an image information buffer 146 to receive and temporarily store received image information 134, or portions thereof. Controller 136 executes image pattern translation instructions 144 in conjunction with image information in buffer 146. Controller 136 executes motion translation instructions 140 in conjunction image information 134 and/or image information stored in buffer 144.

Image information translation system 132 further includes an input/output (I/O) interface 148, which may include a USB port, to interface with computer processor system 104 through I/O interface 112.

Timing/clock generating system 126 is configured to provide one or more clock or timing signals to image information translation system 132. In the example of FIG. 1, timing/clock generating system 126 is illustrated separately from image information translation system 132 and computer processor system 104. Alternatively, image timing/clock generating system 126, or portions thereof, is incorporated within image information translation system 132 and/or computer processor system 104.

Exemplary operation of image information translation system 132 is further described below with reference to FIG. 2.

Multiple instances of optical imaging based computer pointing system 102 may be implemented in computer system 100. This may be useful, for example, for gaming applications that are configured to receive motion information from multiple sources, such as from a multiple-joystick pointing device.

Image information translation system 132 may be implemented with a capacitive sensing touch pad, in place of optical imaging system 130, to translate touch-based motion information and one or more patterns of touch-based information to a pointing device data format.

Figure 2:
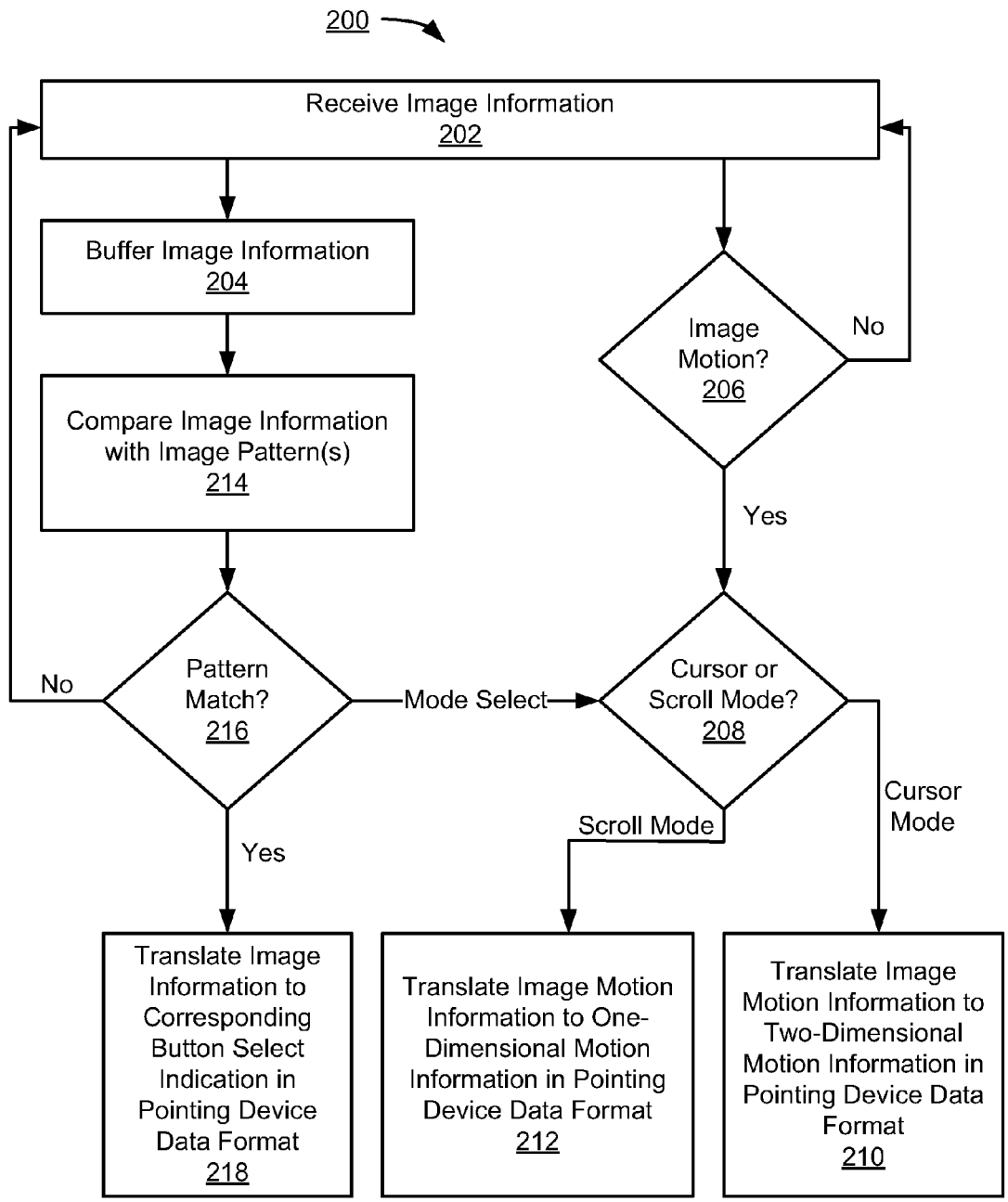
FIG. 2 is a process flowchart 200 illustrating exemplary methods of translating image motion information to a pointing device data format, and translating one or more patterns, sequences, or combinations of image information to one or more corresponding pointing device button select indications in the pointing device data format.

FIG. 2 is a process flowchart 200 illustrating exemplary methods of translating image motion information to a pointing device data format, and methods of translating one or more patterns, sequences, or combinations of image information, detected over a period of time, to one or more corresponding pointing device button select indications, in the pointing device data format. Flowchart 200 further illustrates optional scrolling features.

For illustrative purposes, flowchart 200 is described below with reference to exemplary computer system 100 illustrated in FIG. 1. Flowchart 200 is not, however, limited to implementation with exemplary computer system 100. Based on the disclosure herein, one skilled in the relevant art(s) will understand that methods described and/or illustrated with respect to flowchart 200 may be implemented with other combinations of hardware, software, and/or firmware as well.

At 202 in FIG. 2, image information 134 is received from optical imaging system 130. Image information 134 may be received in response to commands and/or register address information provided by controller 136.

At 204, received image information 134, or portions thereof, is buffered in image information buffer 146.

At 206, when image information 134 includes image motion information, and at 208, when a cursor mode is enabled, the image motion information is translated to two-dimensional motion information in a pointing device format at 210. In the example of FIG. 1, the image motion information is translated by controller 136, in accordance with motion translation instructions 142.

Referring back to 208, when scroll mode is enabled, at 212 the image motion information is translated to one-dimensional scroll motion information in the pointing device data format. Scroll mode is further described below with respect to 214 through 218.

At 210 and 212, the image motion information may be translated using image information 134 and/or buffered image information from image information buffer 146.

At 214, image information detected over a period of time, and stored in image information buffer 146, is compared to one or more image patterns associated with one or more corresponding pointing device button functions. In the example of FIG. 1, the comparison is performed by controller 136, using image pattern translation instructions 144.

Tables 3 and 4 below provide exemplary patterns of image information associated with left and right pointing device buttons, respectively. Tables 5 and 6 below provide exemplary patterns of image information associated with a scroll button.

In Table 3, a single touch or tap on or near the optical window of optical imaging system 130 is associated with a left button press or click. More particularly, a stationary image, present for up to a first period of time, accompanied by preceding and subsequent image absences, is associated with the left button click. The preceding and subsequent image absences help to insure that the stationary image corresponds to a tap, rather a temporary user pause following or preceding user motion across the optical window of optical imaging system 130.

Where image information 134 includes a scaled indication of image presence, as opposed to a yes/no indication, image information translation system 132 may include a defined point or range at which the scaled indication is interpreted as an image presence.

In Table 3, the first period of time is defined as a maximum period of time. The first period of time may also include a minimum period of time for which the stationary image is to be present. The first period of time may be user-configurable. The preceding and subsequent image absences may also include minimum or maximum periods of time, which also may be user-configurable.

TABLE 3

| | Left Button Image Pattern/ Sequence (Single Tap) | Time Period |
|---|---|---|
| 1 | Image Absence | Any |
| 2 | Stationary Image | ≦First Time Period |
| 3 | Image Absence | Any |

In Table 4, an extended-length touch or tap is associated with a right button click. Specifically, a stationary image, present for more than the first period of time and up to a second period of time, accompanied by preceding and subsequent image absences, is associated with a right button click. As with Table 3, time periods associated with the stationary image presence and/or optional time periods associated with image absences may be user configurable.

TABLE 4

| | Right Button Image Pattern/ Sequence (Extended Tap) | Time Period |
| --- | --- | --- |
| 1 | Image Absence | Any |
| 2 | Stationary Image | >First Time Period; and ≦Second Time Period; |
| 3 | Image Absence | Any |

In Table 5, two sequential taps on or near the optical window of the optical imaging system 130 are associated with a scroll mode button click. Specifically, two instances of a stationary image, each present for up to the first period of time, separated by an image absence for up to a pause period of time, and accompanied by preceding and subsequent image absences, are associated with a scroll mode button click. As with Tables 3 and 4, time periods in Table 5 may be user configurable.

In Table 6, when in scroll mode, a subsequent tap is associated with a return-to-cursor mode selection, similar to a left button click described above with respect to Table 3.

TABLE 5

| | Scroll Mode Select Image Pattern/ Sequence (Double-Tap) | Time Period |
| --- | --- | --- |
| 1 | Image Absence | Any |
| 2 | Non-Moving Image Presence | ≦First Time Period |
| 3 | Image Absence | ≦Pause Period |
| 4 | Non-Moving Image Presence | ≦First Time Period |
| 5 | Image Absence | Any |

TABLE 6

| | Return to Cursor Mode Image Pattern/ Sequence (Single Tap) | Time Period |
| --- | --- | --- |
| 1 | Image Absence | Any |
| 2 | Non-Moving Image Presence | ≦First Time Period |
| 3 | Image Absence | Any |

The comparison at 214 may be performed repetitively over time, comparing a sliding window of image information from image buffer 146 to the image pattern(s).

At 216, when the image information matches a pattern associated with a button, image information translation system 132 generates a corresponding button select indication in the pointing device data format.

Pointing device output information translated at 210, 212 and 218, is output to computer processor system 104 via I/O interface 148 and I/O interface 112.

Physical Positioning of an Optical Window

Computer system 100 may include a housing assembly, with computer processor system 104 and image information system 132 located therein, and a display coupled thereto. The computer system 100 may further include a keyboard coupled thereto. Computer system 100 may be configured as a lap-top or note-book computer, a desk-top computer, a computer-based note pad, a gaming console, and/or other computer configuration.

The optical window of optical imaging system 130 is positioned relative to computer system 100 to allow a user to place and move an object, such as a user finger or stylus device, proximate to the optical window. The optical window may be positioned on a surface of the computer housing assembly, a surface of a display housing assembly, proximate to or amongst keys of the keyboard, or on a separate pointing device housing assembly, such as in a hand-held gaming controller. The optical window may be positioned with an upper surface of the optical window substantially aligned with or below an adjacent surface or surfaces, such as upper surfaces of adjacent keyboard keys. Alternatively, the upper surface of optical imaging system 130 may extend beyond an adjacent surface. The upper surface of the optical window may be in the shape of a square, a rectangle, other polygon, a circle, or an oval.

Figure 3:
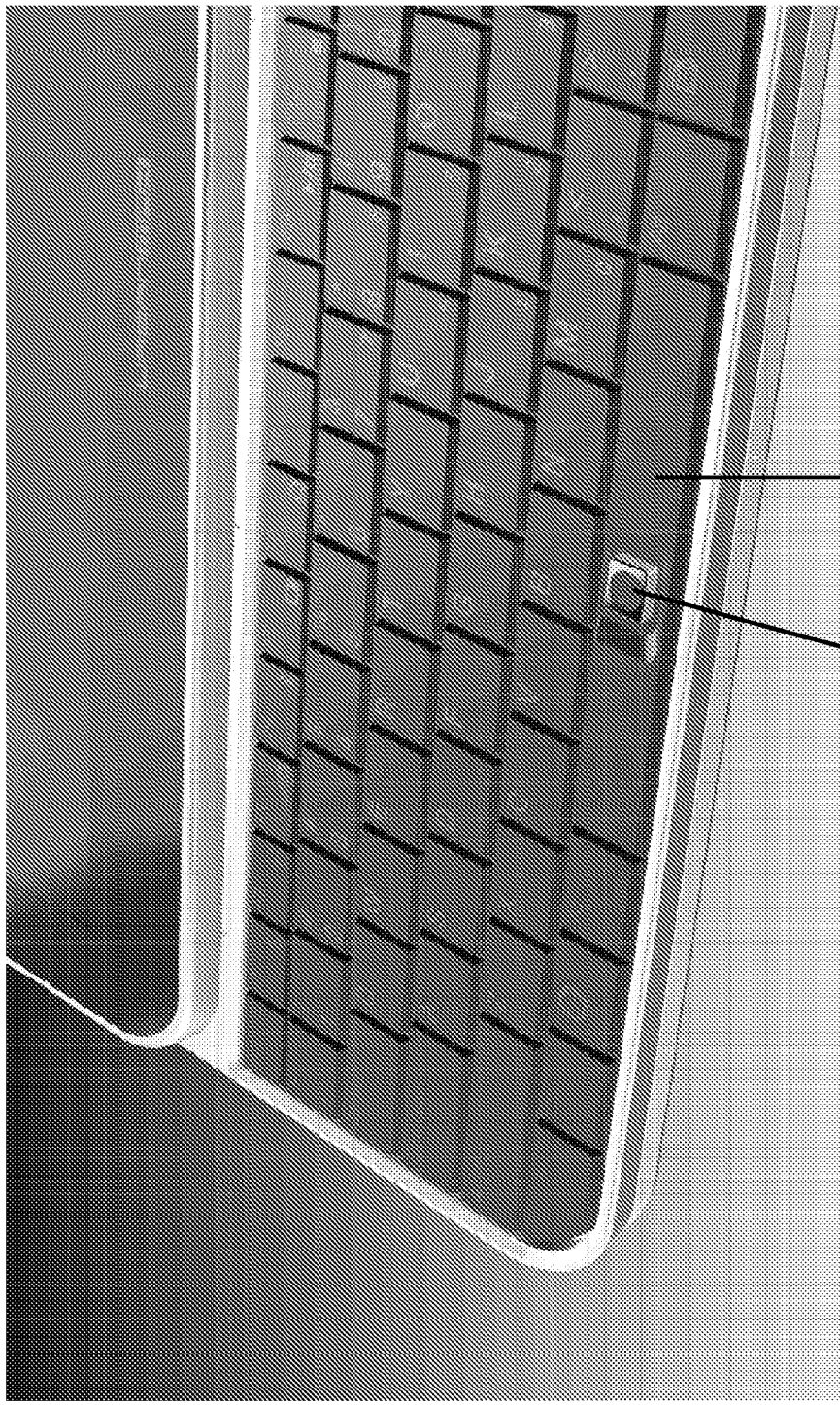
FIG. 3 is a perspective view of a computer system 300 illustrating an exemplary placement of an optical window 302 of an optical imaging based pointing system.

FIG. 3 is a perspective view of an exemplary computer system 300, including an optical window 302 positioned within a key 304 of a keyboard. In the example of FIG. 3, key 304 includes an indentation portion configured to conform around at least a portion of optical window 302.

Figure 4:
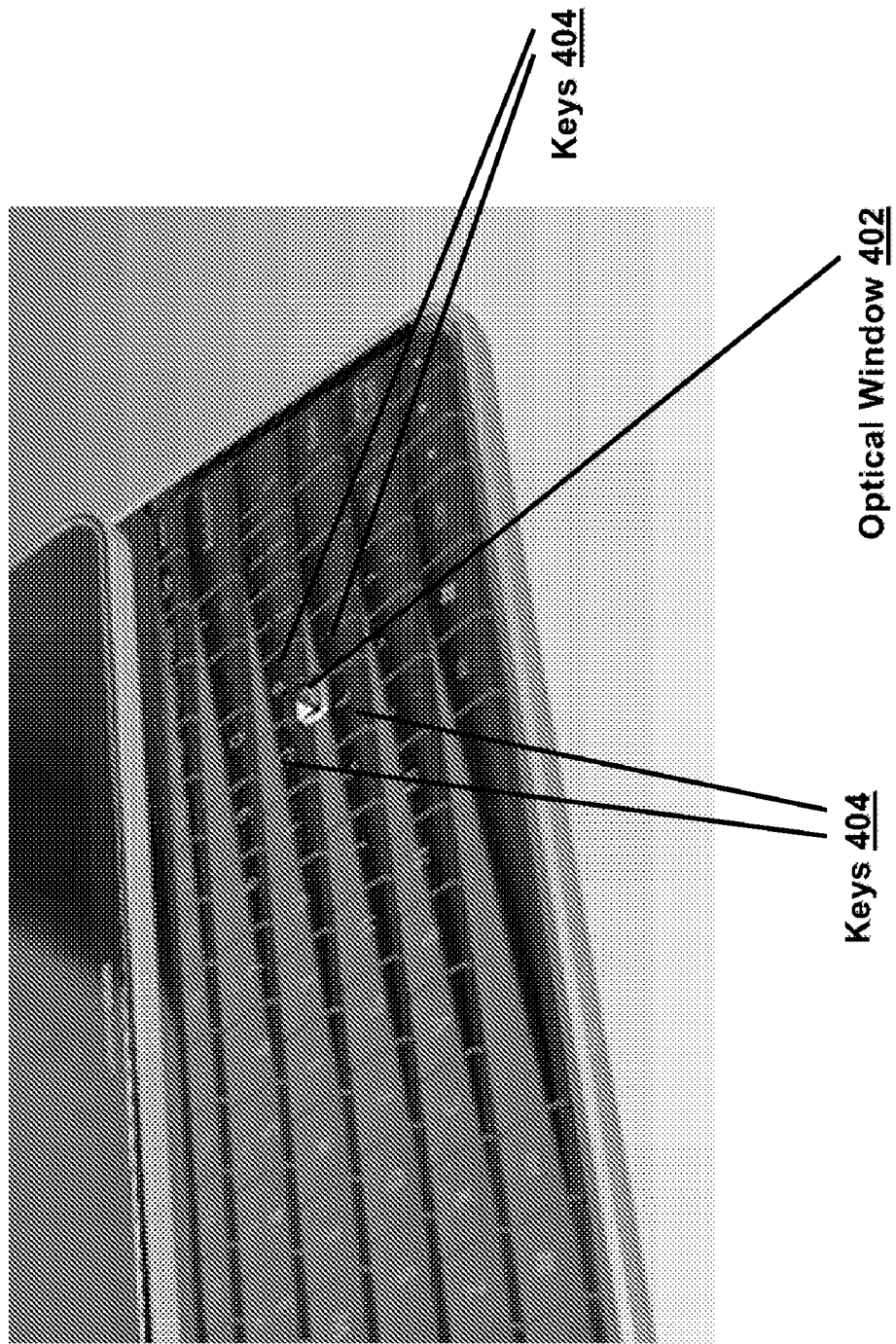
FIG. 4 is a perspective view of a computer system 400 illustrating an exemplary placement of an optical window 402 of an optical imaging based pointing system.

FIG. 4 is a perspective view of an exemplary computer system 400, including an optical window 402 positioned between letter keys 404 of a keyboard. In the example of FIG. 4, letter keys 404 each include an indentation portion configured to conform around a corresponding abutting portion of optical window 402.

In the examples of FIGS. 3 and 4, optical windows 302 and 402 have respective surface areas that are less than respective surface areas of key 304 and letter keys 404. Alternatively, an optical window surface area may be equal to or greater than a surface area of a keyboard key. The optical window surface area may be, for example and without limitation, approximately 5 millimeters (mm) by 5 mm, or 25 mm$^2$.

CONCLUSION

Methods and systems to provide optical imaging based computer pointing, including motion and button functionality, in a pointing device data format, have been described above with the aid of functional building blocks illustrating the functions, features, and relationships thereof. At least some of the boundaries of these functional building blocks have been arbitrarily defined herein for the convenience of the description. Alternate boundaries can be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments been described above, it should be understood that they have been presented by way of example only, and not limitation. It will be apparent to persons skilled in the relevant art that various changes in form and detail can be made therein without departing from the spirit and scope of the methods and systems disclosed herein. Thus, the breadth and scope of the claims should not be limited by any of the above-described exemplary embodiments.

What is claimed is:

1. A computer-implemented method, comprising:
   evaluating multi-dimensional coordinate information from
      an object sensor to identify occurrences of, no object proximate to the sensor, a stationary object proximate to the sensor, and a moving object proximate to the sensor;

generating a first pointer device button select indication when the multi-dimensional coordinate information corresponds to a first pattern that includes at least one occurrence of a stationary object proximate to the sensor and at least one occurrence of no object proximate to the sensor; and translating the multi-dimensional coordinate information to motion information in a pointer device format when the multi-dimensional coordinate information corresponds to a moving object proximate to the sensor.

2. The method of claim 1, wherein the first pattern includes at least one occurrence of a stationary object proximate to the sensor for up to a first period of time.

3. The method according to claim 1, wherein the first pattern includes at least one occurrence of a stationary object proximate to the sensor for at least a first period of time and up to a second period of time.

4. The method of claim 1, wherein:
the first pattern includes at least one occurrence of a stationary object proximate to the sensor for up to a first period of time; and
the method further includes generating a second pointer device button select indication when the multi-dimensional coordinate information corresponds to a second pattern that includes at least one occurrence of a stationary object proximate to the sensor for more than the first period of time and up to a second period of time.

5. The method of claim 1, further including:
translating the multi-dimensional coordinate information to multi-dimensional coordinate information in a pointer device format when the multi-dimensional coordinate information corresponds to a moving object proximate to the sensor;
outputting a scroll button select indication when the multi-dimensional coordinate information corresponds to a scroll button select pattern that includes at least one occurrence of a stationary object proximate to the sensor and at least one occurrence of no object proximate to the sensor; and
translating the multi-dimensional coordinate information to one-dimensional scrolling information subsequent to the outputting of the scroll button select indication.

6. The method of claim 1, further including:
providing the first pointer device button select indication in a pointer device format to a computer system having a corresponding pointer device driver, over a universal serial bus (USB) interface.

7. The method of claim 1, wherein the object sensor includes an optical image sensor.

8. A system, comprising:
an information translation system to,
evaluate multi-dimensional coordinate information from an object sensor to identify occurrences of, no object proximate to the sensor, a stationary object proximate to the sensor, and a moving object proximate to the sensor,
generate a first pointer device button select indication when the multi-dimensional coordinate information corresponds to a first pattern that includes at least one occurrence of a stationary object proximate to the sensor and at least one occurrence of no object proximate to the sensor, and
translate the multi-dimensional coordinate information to motion information in a pointer device format when the multi-dimensional coordinate information corresponds to a moving object proximate to the sensor.

9. The system of claim 8, wherein the first pattern includes at least one occurrence of a stationary object proximate to the sensor for up to a first period of time.

10. The system of claim 8, wherein the first pattern includes at least one occurrence of a stationary object proximate to the sensor for at least a first period of time and up to a second period of time.

11. The system of claim 8, wherein:
the first pattern includes at least one occurrence of a stationary object proximate to the sensor for up to a first period of time; and
the information translation system is further implemented to generate a second pointer device button select indication when the multi-dimensional coordinate information corresponds to a second pattern that includes at least one occurrence of a stationary object proximate to the sensor for more than the first period of time and up to a second period of time.

12. The system of claim 8, wherein the information translation system is further implemented to:
translate the multi-dimensional coordinate information to multi-dimensional coordinate information in a pointer device format when the multi-dimensional coordinate information corresponds to a moving object proximate to the sensor;
output a scroll button select indication when a sequence of the multi-dimensional coordinate information corresponds to a scroll button select pattern that includes at least one occurrence of a stationary object proximate to the sensor and at least one occurrence of no object proximate to the sensor; and
translate the multi-dimensional coordinate information to one-dimensional scrolling information subsequent to the scroll button select indication.

13. The system of claim 8, wherein the information translation system includes a first instruction processor, the system further including:
the object sensor;
a computer system including a second instruction processor and a pointer device driver; and
a universal serial bus (USB) interface;
wherein the information translation system is implemented to provide the first pointer device button select indication in a pointer device format to the computer system over the USB interface.

14. The system of claim 8, wherein the object sensor includes an optical image sensor.

15. A non-transitory computer readable medium encoded with a computer program, including instructions to cause a processor to:
evaluate multi-dimensional coordinate information from an object sensor to identify occurrences of, no object proximate to the sensor, a stationary object proximate to the sensor, and a moving object proximate to the sensor;
generate a first pointer device button select indication when the multi-dimensional coordinate information corresponds to a first pattern that includes at least one occurrence of a stationary object proximate to the sensor and at least one occurrence of no object proximate to the sensor; and
translate the multi-dimensional coordinate information to motion information in a pointer device format when the multi-dimensional coordinate information corresponds to a moving object proximate to the sensor.

16. The computer readable medium of claim 15, wherein the first pattern includes at least one occurrence of a stationary object proximate to the sensor for up to a first period of time.

17. The computer readable medium of claim 15, wherein the first pattern includes at least one occurrence of a stationary object proximate to the sensor for at least a first period of time and up to a second period of time.

18. The computer readable medium of claim 15, wherein:
the first pattern includes at least one occurrence of a stationary object proximate to the sensor for up to a first period of time; and
the instructions include instructions to cause the controller to generate a second pointer device button select indication when the multi-dimensional coordinate information corresponds to a second pattern that includes at least one occurrence of a stationary object proximate to the sensor for more than the first period of time and up to a second period of time.

19. The computer readable medium of claim 15, wherein the instructions include instructions to cause the controller to:
translate the multi-dimensional coordinate information to multi-dimensional coordinate information in a pointer device format when the multi-dimensional coordinate information corresponds to a moving object proximate to the sensor;
generate a scroll button select indication when the multi-dimensional coordinate information corresponds to a scroll button select pattern that includes at least one occurrence of a stationary object proximate to the sensor and at least one occurrence of no object proximate to the sensor; and
translate the multi-dimensional coordinate information to one-dimensional scrolling information subsequent to the scroll button select indication.

20. The computer readable medium of claim 15, wherein the multi-dimensional coordinate information includes $\Delta X$ and $\Delta Y$ information.

* * * * *